(12) United States Patent
Myers et al.

(10) Patent No.: US 7,158,123 B2
(45) Date of Patent: Jan. 2, 2007

(54) SECONDARY TOUCH CONTEXTUAL SUB-MENU NAVIGATION FOR TOUCH SCREEN INTERFACE

(75) Inventors: Thomas A. Myers, Rochester, NY (US); Marc J. Krolczyk, Rochester, NY (US); Travis Eckler, Brockport, NY (US); Jeremy H. L. Griffith, Rochester, NY (US); Brandon S. McComber, Rochester, NY (US); Richard S. Ranke, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 910 days.

(21) Appl. No.: 10/356,273

(22) Filed: Jan. 31, 2003

(65) Prior Publication Data

US 2004/0150668 A1 Aug. 5, 2004

(51) Int. Cl.
*G09G 5/00* (2006.01)

(52) U.S. Cl. .................... 345/173; 345/179; 715/700; 399/81

(58) Field of Classification Search ............... 345/173, 345/179; 715/700, 810, 828, 829; 399/81, 399/82

See application file for complete search history.

(56) References Cited

U.S. PATENT DOCUMENTS

| | | | |
|---|---|---|---|
| 4,299,041 A | 11/1981 | Wilson | |
| 4,310,839 A | 1/1982 | Schwerdt | |
| 4,332,464 A | 6/1982 | Bartulis et al. | |
| 4,587,520 A | 5/1986 | Astle | |
| 4,587,630 A | 5/1986 | Straton et al. | |
| 4,686,332 A | 8/1987 | Greanias et al. | |
| 4,755,811 A | 7/1988 | Slavin et al. | |
| 5,119,079 A | 6/1992 | Hube et al. | |
| 5,500,717 A * | 3/1996 | Altrieth, III | 399/83 |
| 6,259,436 B1 * | 7/2001 | Moon et al. | 345/173 |
| 6,400,462 B1 * | 6/2002 | Hille | 358/1.14 |
| 6,580,442 B1 * | 6/2003 | Singh et al. | 175/840 |
| 6,664,991 B1 * | 12/2003 | Chew et al. | 715/863 |
| 6,957,397 B1 * | 10/2005 | Hawkins et al. | 715/856 |
| 7,010,751 B1 * | 3/2006 | Shneiderman | 715/764 |
| 7,058,902 B1 * | 6/2006 | Iwema et al. | 715/810 |
| 7,068,260 B1 * | 6/2006 | Hill | 345/173 |
| 2002/0163543 A1 * | 11/2002 | Oshikiri | 345/810 |
| 2003/0193525 A1 * | 10/2003 | Nygaard, Jr. | 345/810 |

* cited by examiner

*Primary Examiner*—Richard Hjerpe
*Assistant Examiner*—Kimnhung Nguyen
(74) *Attorney, Agent, or Firm*—Fay, Sharpe, Fagan, Minnich & McKee, LLP (57) ABSTRACT

A touch sensitive user interface of the type having a display screen for displaying images representative of menus and selectable list objects, for example; control logic responsive to the touch sensitive user interface for determining the contact position of a first probe and a second probe, such as two separate fingers, thereon, displaying menus including list objects representing primary and secondary features or functions respectively, so that a user may touch a selection on the primary menu with the first probe and subsequently touch an area on the display screen where a contextually related secondary menu is displayed for selection of contextually related features or functions.

20 Claims, 9 Drawing Sheets

SECONDARY TOUCH CONTEXTUAL SUB-MENU NAVIGATION FOR TOUCH SCREEN INTERFACE

BACKGROUND OF THE INVENTION

Touch sensitive screen user interfaces facilitate the selection of copying parameters on a reprographic system. Such systems allow users to visually determine the copying feature set that has been selected prior to starting the job, as well as the status of the job during execution. Touch sensitive screen user interface systems currently available on the market employ a series of programming menus, whereby the copy features are selected by touching the desired feature icons contained on the display screen.

The most commonly used pointing device used for selection of features on a touch sensitive screen is a finger. Due to the size of the average finger, and errors in positioning the finger, it has been found necessary to construct menus of selectable features using relatively large touch sensitive zones for each selectable item on the menu. Typically these areas have minimum dimensions on the order or ½ to ¾ inches ("finger resolution"). When combined with a rather limited display area, there is only a limited number of items that can be simultaneously displayed for possible selection on a specific display frame. It would be desirable to provide a greater number of items for selection, but reducing the sensitive zones to less than finger resolution results in difficulty in making selections due to the relative inaccuracy of positioning a large finger on a small area, including uncontrollable finger movement and inaccurate hand placement. Placement of the probe centered near the edge of the selection area may result in a toggling action as the finger is inadvertently and unconsciously moved between selections. Of course, the smaller the selection area, the nearer to an edge the probe must be placed. It would be desirable to avoid accidental selection of a feature due to relatively small, inadvertent or unconscious movement of the finger or probe.

U.S. Pat. No. 4,332,464 to Bartulis et al. discloses a user interface for a copying machine, comprising a video display and a touch sensitive device capable of detecting user requests via touching of the display surface. Moreover, the user interface is used to display visual elements representative of the feature set currently selected, including, optional feature selections that are available. U.S. Pat. No. 4,587,630 to Straton et al. discloses an intelligent programmable touch screen system which uses a cursor to provide feedback to a user. A means is provided for the system to correctly interpret a finger position and change it into a screen position. U.S. Pat. No. 4,587,520 to Astle discloses a cursor controlled page selection system using a cursor which can have a variety of physical characteristics. This system makes use of a joystick, which is tracked by a cursor. U.S. Pat. No. 4,310,839 to Schwerdt discloses an interactive display system with touch data entry which uses touch switches and cursors to highlight a selection by inverting the entire selection. U.S. Pat. No. 4,686,332 to Greanias et al. discloses a finger touch detection system which calculates a screen position from a finger position. A touch cursor tracks the movement of the finger. U.S. Pat. No. 4,299,041 to Wilson shows a touch sensitive greeting card in which activation commences operation of an effects generator causing a change of appearance in a display. U.S. Pat. No. 4,755,811 to Slavin et al. shows an arrangement for touch controlled zoom of an image on a waveform display. Statutory Invention Registration H716 by MacDonald et al. shows a touch sensitive screen in which selection problems associated with parallax are remedied by placing a guard band around each touch sensitive area corresponding in size to an amount of parallax error. The patents and publications cited herein are incorporated by reference for their teachings.

SUMMARY OF THE INVENTION

A method and system are provided for a touch sensitive user interface system including a display screen for displaying a plurality of primary and secondary images representative of primary and secondary selectable options. A touch sensitive means is provided for detecting the presence of a first probe and a second probe in contact with the display screen, and control logic is responsive to the touch sensitive means for determining the first probe contact position. The control logic defines for each primary image representative of a primary selectable option, a first probe contact area of predetermined size, over which contact with the first probe selects the primary option, displays a secondary menu including a plurality of secondary images representative of secondary selectable options, and defines for each secondary image representative of a secondary selectable option, a second contact area of predetermined size, over which contact with the second probe selects the secondary option.

DETAILED DESCRIPTION OF THE PREFERRED EMBODIMENT

It will become evident from the following discussion that embodiments of the present application set forth herein, are suited for use in a wide variety of printing and copying systems, and are not necessarily limited in application to the particular systems illustrated.

Figure 1:
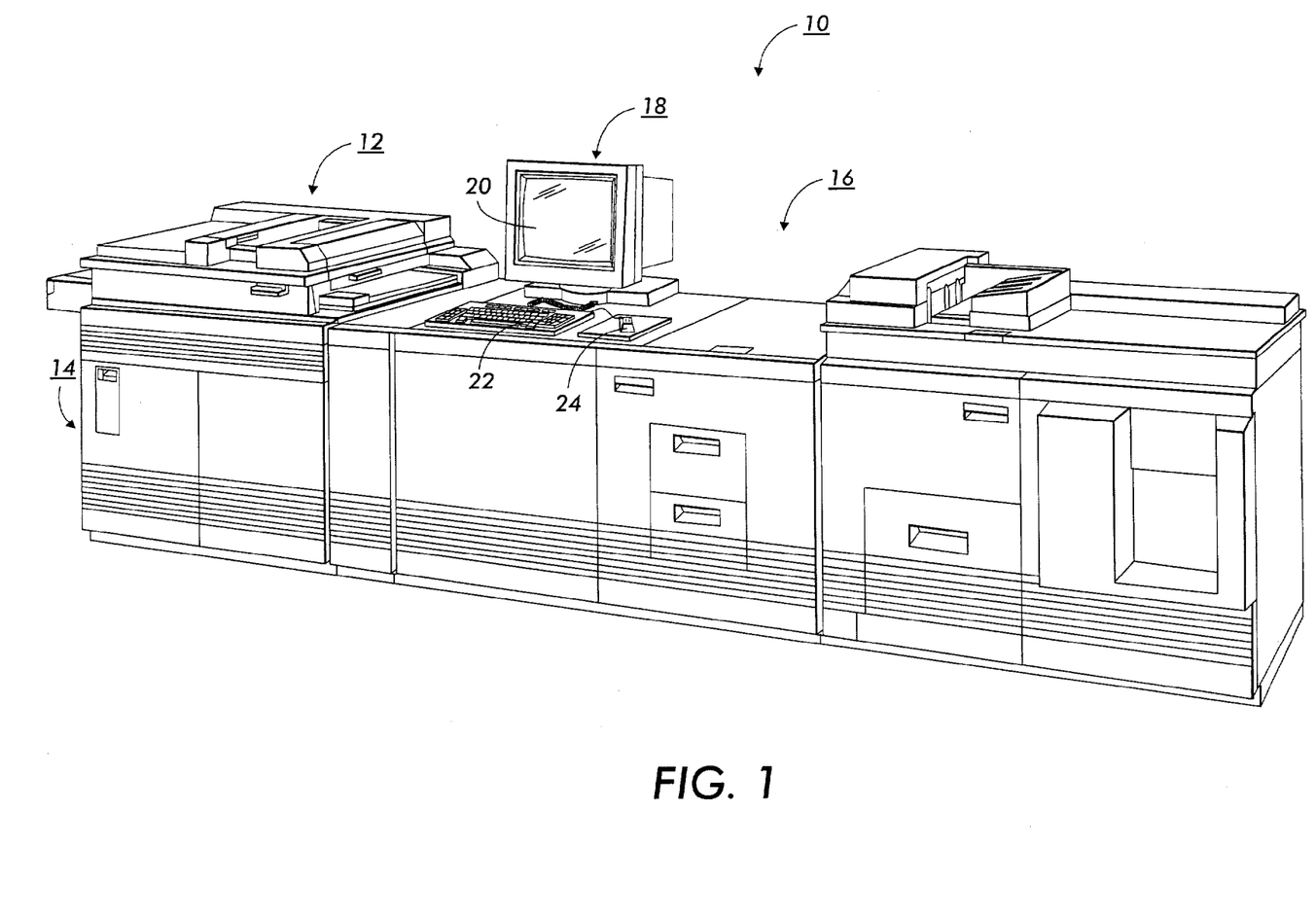
FIG. 1 is an isometric drawing of an exemplary xerographic system incorporating the present invention.

With reference to the drawings, where the showings are for the purpose of illustrating an embodiment of the invention and not for the purpose of limiting same, FIG. 1 shows an exemplary laser based printing system 10 for processing print jobs in accordance with the teachings of the present invention. Printing system 10 includes a scanner section 12, controller section 14, and printer section 16. While a specific printing system is shown and described, the present invention may be used with other types of printing systems such as, e.g., ink jet, ionographic, etc.

The printing system 10 further includes a User Interface (UI) 18 having a combined operator controller/CRT display comprising an interactive touch sensitive screen 20, keyboard 22, and mouse 24. The UI 18 enables the operator of the printing system 10 to program print jobs and other instructions to the system, and to obtain system operating information, instructions, programming information, diagnostic information, etc. from the system. Items displayed on the touchscreen 20 such as files and icons are actuated by either touching the displayed item on the screen 20 with a finger or by using the mouse 24 to point a cursor (not shown) to an item selected and keying a button on the mouse. A similar user interface is described in U.S. Pat. No. 5,119,079, issued Jun. 2, 1992 to Hube et al., the relevant portions thereof being hereby incorporated by reference into the present application. Generally, operation and control information is stored in a system memory and accessed by the system controller 14 when necessary. The system controller 14 regulates the operation of the system based on user programming of desired features, and the system status, as determined by conventional switches and sensors. The features within the machine are then regulated through the control of individual electrical and electromechanical devices, such as conventional servomotors, solenoids, etc.

Figure 2:
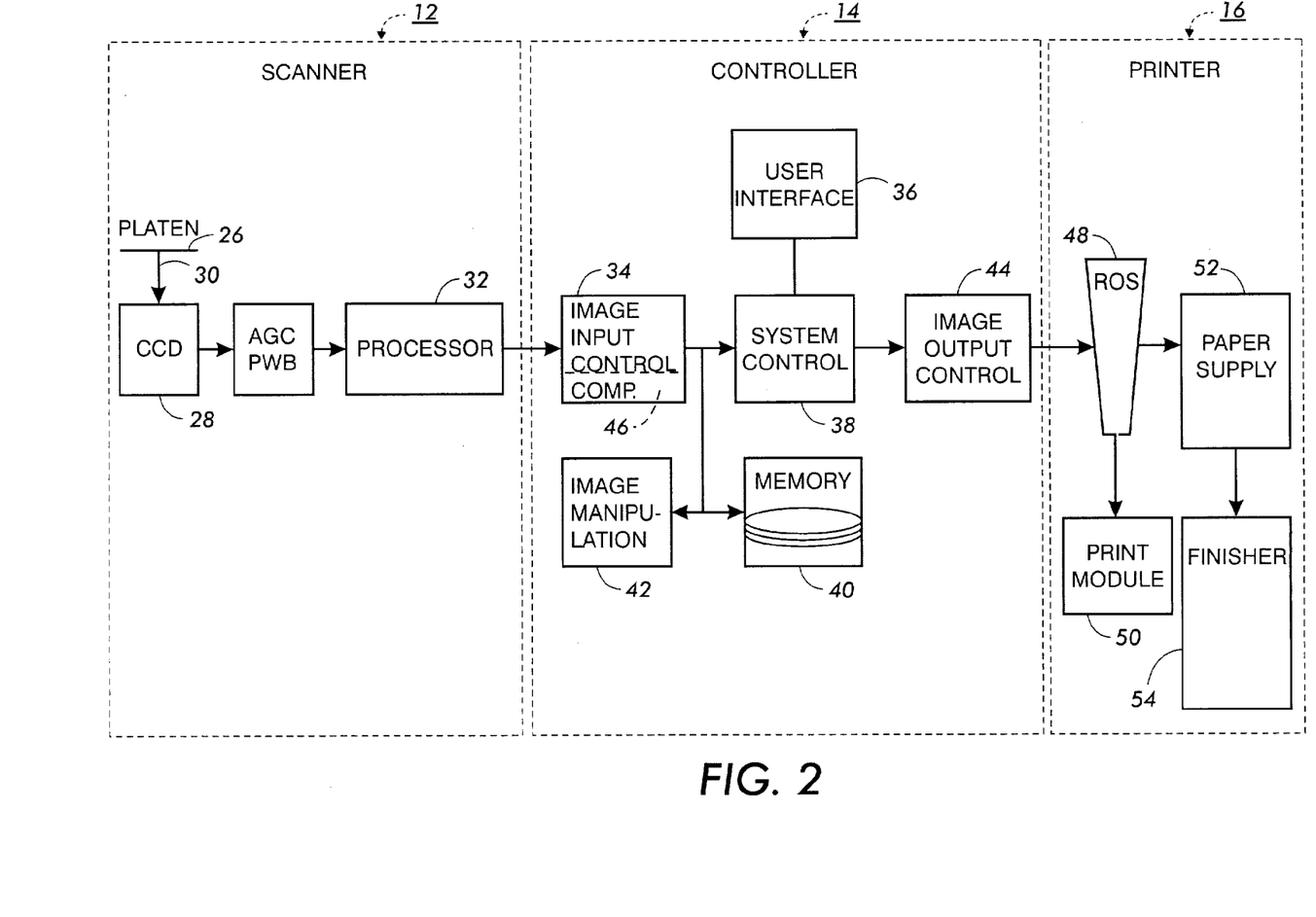
FIG. 2 is a block diagram showing major elements of the xerographic system shown in FIG. 1.

With reference to FIG. 2, the scanner section 12 incorporates a transparent platen 26 on which a document to be scanned is located. One or more linear arrays 28, e.g. CCD arrays, are supported for reciprocating scanning movement below the platen 26. A system of lenses and mirrors 30 cooperate to focus the array 28 on a line-like segment of the platen 26 and the document being scanned thereon. The array 28 provides analog image signals representative of the image scanned which, after suitable processing by a processor 32, are output to the controller section 14.

The processor 32 converts the analog image signals output by the array 28 to digital image signals, or pixels, and processes the image signals as required to enable the system 10 to store and handle the image data in a form required to carry out the job programmed. The processor 32 also provides enhancements and changes to the image signals such as filtering, thresholding, screening, cropping, reduction/enlarging, etc. Following any changes and adjustments in the job program, the document should be rescanned.

The controller section 14 includes an image input controller 34, a User Interface (UI) 36, a system controller 38, a memory 40, an image manipulation section 42, and image output controller 44. The memory 40 is a combination of random access memory (RAM) and magnetic disk wherein the magnetic disk is used for storing large files of information such as, e.g., operating system software and scanned image files.

Scanned image data input from the processor 32 of the scanner section 12 to controller section 14 is compressed by an image compressor/processor 46 of the image input controller 34. The compressed image data, together with any related image descriptors providing image specific information (such as height and width of the document in pixels, the compression method used, pointers to the compressed image data, and pointers to the image slice pointers) are placed in an image file. The image files, which represent different print jobs, are temporarily stored in memory 40 where the data is held pending use.

Image data, when ready for printing, is decompressed and output to the image output controller 44. Following this, the data is output to the printer section 16. Image data sent to the printer section 16 for printing is normally purged from the memory 40 to make room for new image data. The printer section 16 is a laser type printer, separated into a Raster Output Scanner (ROS) section 48, a print module section 50, a paper supply section 52, and a finisher 54.

Figure 3:
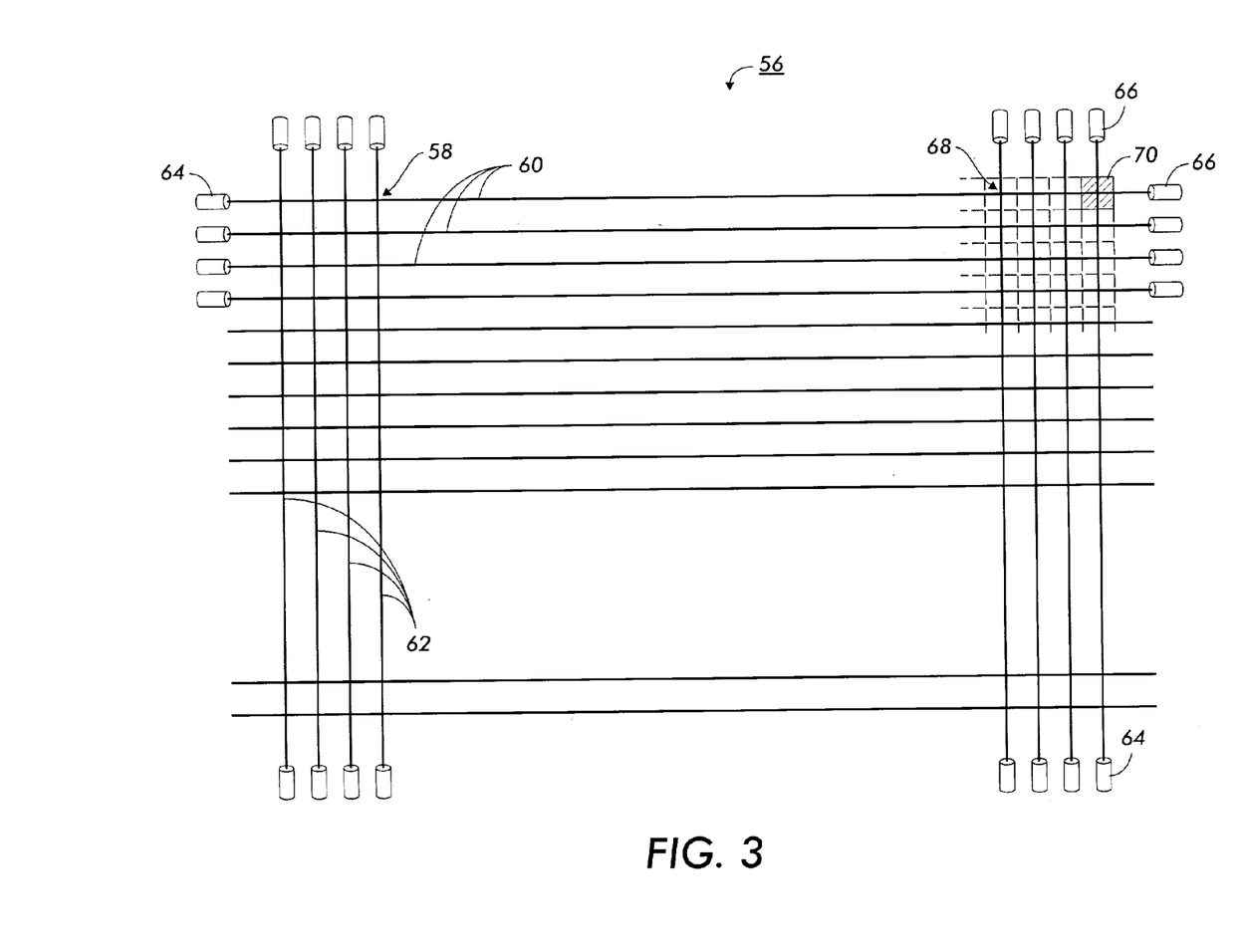
FIG. 3 is an illustration of the touch screen sensing grid and image display cells of the user interface of FIG. 2.

Referring now to FIG. 3, and continuing reference to FIG. 1, the touch sensitive screen 20 includes a touch sensor 56. A regular rectangular grid 58 is formed by the intersection of horizontal light beams 60 and vertical light beams 62. Light, in the visible or infrared spectrum, emanating from light sources 64, is directed towards photodetectors 66 located on sides directly opposite the light sources, so as to form distinct light source-photodetector pairs, hereinafter referred to as source-detector pairs. The light beams defined by the source-detector pairs are used to detect the presence of a user's finger, or other such probe, in close proximity to the display screen. The probe is detected when one or more photodetectors is unable to detect the light beam which is normally incident upon it. The lack of an incident light beam causes the photodetector to alter its output signal, thereby indicating the presence of the probe. The user interface 36 control electronics process the photodetector signals to provide an indication that a probe has been detected, as well as the coordinate position of the center of the probe, both of which are output to the system controller 38. This form of interface may comprise capacitive grids and pressure sensitive pads as well as other known technologies used in this art.

Also illustrated in FIG. 3 is an image display grid 68, composed of uniform rectangular cells 70. The display grid 68 is used to divide the display screen 20, into display cells, the centers of which correspond with the intersection points of the horizontal and vertical light beams, 60 and 62 respectively. Division of the display screen in this manner defines the smallest possible cell or contact region that may be detected by the user interface 36, a region having dimensions defined by the spacing between adjacent photodetectors. Of course, probes smaller than the contact region are detectable, but most probes will be larger.

Figure 4:
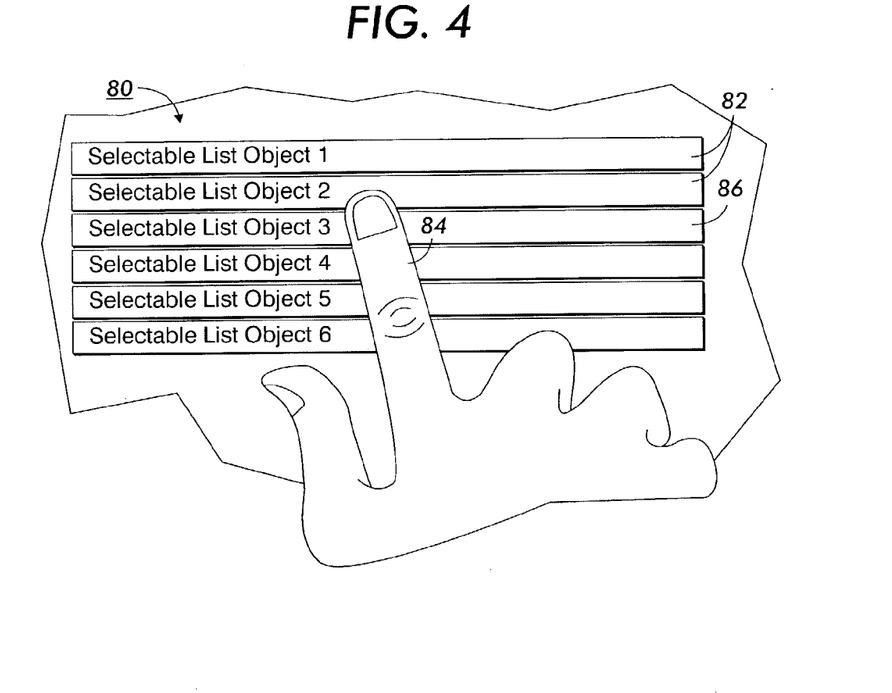
FIG. 4 is a view of an exemplary primary menu prior to selection of a list object.

Jobs and other processing on the printing system 10 are programmed by means of menus presented on the display screen 20. Referring to FIG. 4, an exemplary menu 80 is shown having selectable list objects 82 which may be selected by means of the mouse 24 or, alternately, by means of touch screen technology. Each selectable list object 82 shown in FIG. 4 represents a programmable feature or function in the printing system 10. In the illustration, a user has placed his or her index finger 84 over selectable list object 3 in anticipation of selecting list object 3 represented by numeral 86. However, the user has not yet touched the screen and none of the selectable list objects have yet been selected. Although, as described herein, a user's fingers are used as probes or pointers, it is to be understood that any suitable object, such as a pen for example, may be used.

Figure 5:
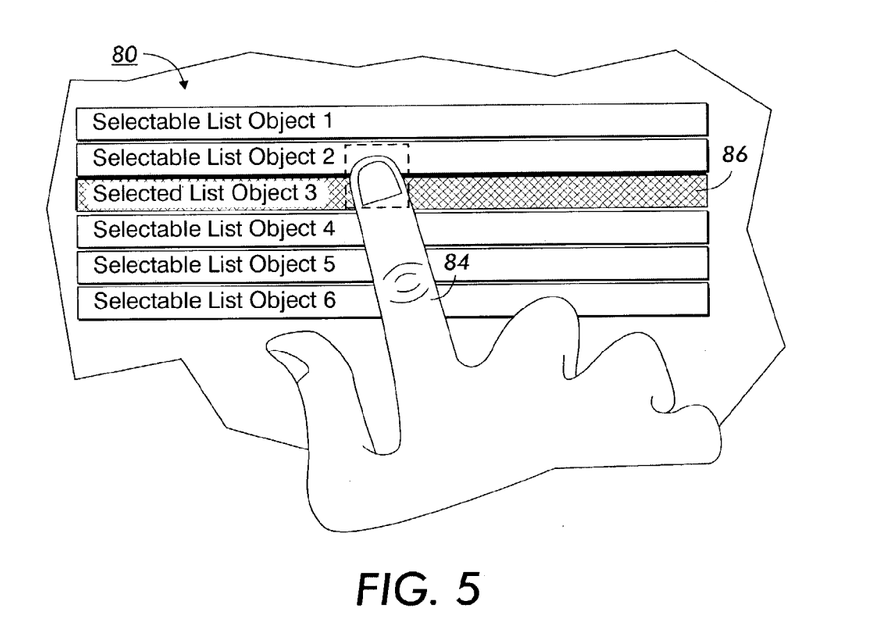
FIG. 5 is a view of an exemplary primary menu following selection of a list object by contact of a first probe.

Referring now to FIG. 5, the user is touching his or her index finger 84 to select list object 3, represented by numeral 86, and the system has darkened list object 3 on the display screen 20 to show that it is currently the selected list object. The manner in which this was accomplished by system 10 is now explained in more detail.

The boundary of selected list object 3 encompasses one or more of display cells 70 (FIG. 3), thus list object 3 is defined by a predetermined cell or cells covering the area defined by the boundary of list object 3. Likewise, each list object on the screen and the menu itself are identified by the predefined cells enclosed within the respective boundaries. Being that the user's index finger encompasses a plurality of cells, however, the system 10 typically identifies which list object is selected by determining where the center of the detected cells lies with respect to the predefined areas. It is for this reason that the system 10 highlights what it determines the selected object to be so that a user is provided positive feedback and is assured that he or she has selected the correct list object and may move his or her index finger or other pointing device if necessary.

A preferred method for a user to invoke a function associated with a selected list object, is to first select the object as shown in FIG. 5 and then release his or her finger or other pointing device, thus informing the system that the selected list object represents a function that is to be performed by printing system 10. If, on the other hand, a user changes his or her mind and does not want to select any of the presented list objects and instead wants to clear the menu from the screen, the preferred method is for the user to maintain contact with the screen while sliding his or her index finger 84, or other pointing device, outside of the menu area 80 and then releasing his or her finger from the screen, thereby indicating to printing system 10 that no action is to be performed and the menu is to be cleared from the screen.

The actual control signal which enables invocation of the selected feature or process is produced upon detecting the probe leaving contact with the screen, so that the last touched item is the one acted upon. Acknowledgement of selection of a feature or list object is usually indicated by highlighting the selected feature, however, concurrent feedback acknowledging the presence of the probe at the contact zone may be provided by other means such as a visual indicator within said contact zone (including, but not limited to the display of a cross-hair, arrow, or cursor-like image) as well as optionally providing an audible indicator (including but not limited to: a simple tone, a complex tone, a musical note, a sequence of notes, a buzzer sound, a bell sound or a click sound).

The above-described methods for menus used on a touch screen for selecting list objects are well known in the art. The methods described, however, are limited in functionality when compared to the functionality provided by a mouse, such as using a right mouse click to select a secondary contextual menu related to the currently selected list object. The features of the present invention are now described that provide a functionality similar to a right mouse click, in order to have the system present a secondary menu that is contextually related to the primary selected menu. For this purpose, the user interface 36 is so designed that it can detect a second selection area on the touch screen 20. A method of utilizing the second touch detection is now described.

Figure 6:
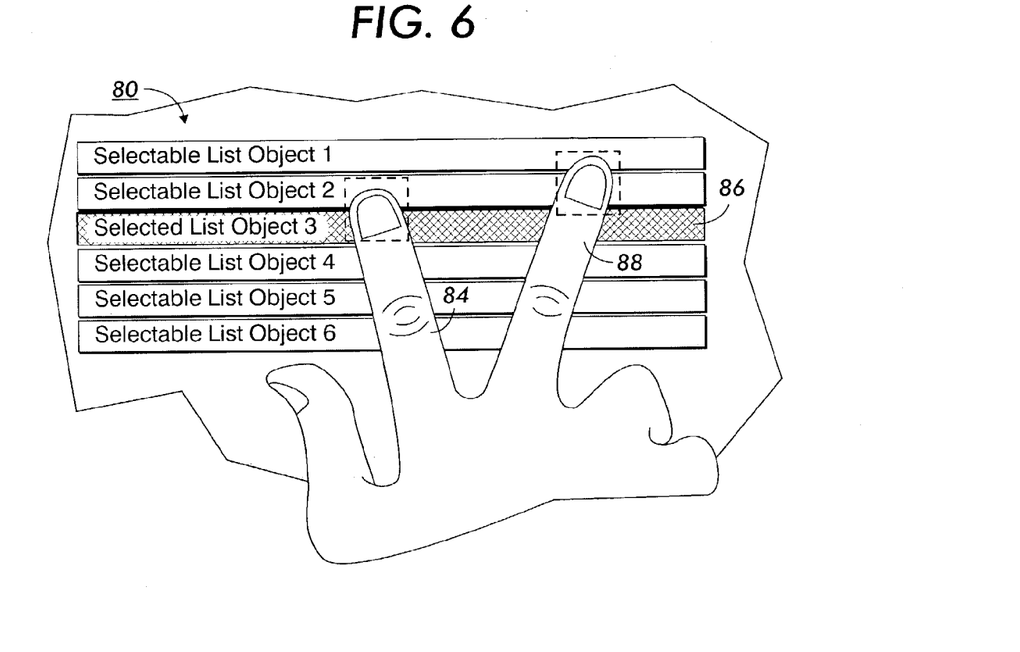
FIG. 6 is a view of an exemplary primary menu following selection of a list object by contact of the first probe, prior to contact with a second probe.
Figure 7:
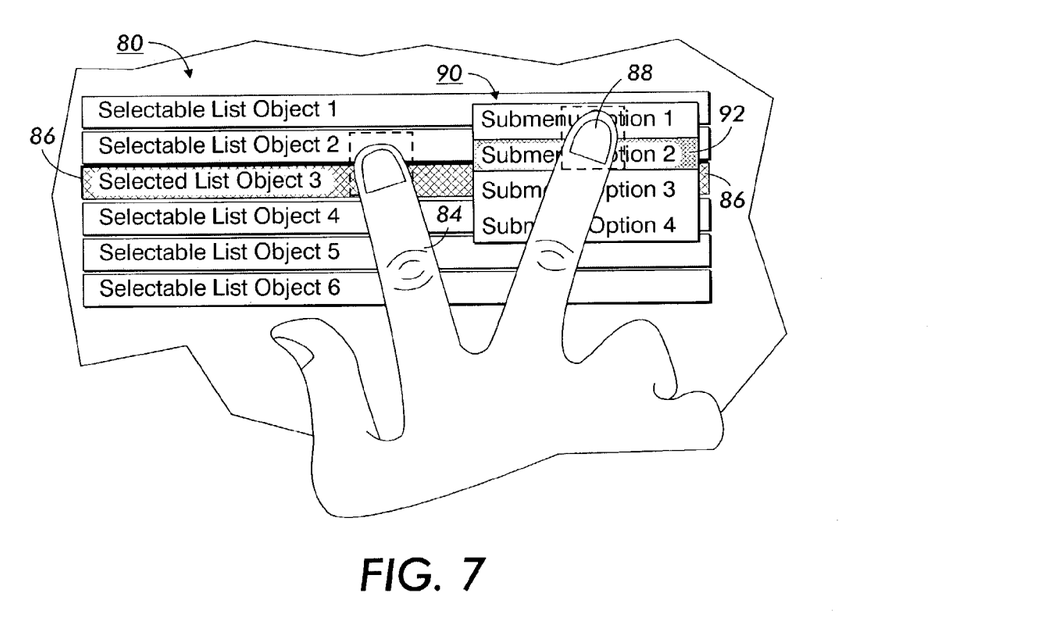
FIG. 7 is a view of exemplary primary and secondary menus following contact of the first probe and the second probe.

In FIG. 6, a user, while maintaining touch with index 84, desires to see a menu contextually related to list object 3, at a location indicated by a middle finger 88. In the illustration, however, the user has not yet contacted the screen with the middle finger 88. Referring now to FIG. 7, while the user maintains contact with the index finger 84, the user now contacts the touch screen 20 with the middle finger 88, and a secondary contextual menu 90 is subsequently displayed by the system, presenting secondary list objects related to the selected list object 86. The secondary menu 90 operates in a fashion similar to the primary menu 80 in that the user slides the secondary middle finger 88 to a desired option on menu 90. In the example shown, the user is currently selecting option 2 represented by numeral 92. If the user, at this point, wishes to invoke the function defined by option 2, the user then releases the middle finger 88 while option 2 is shown as selected by the system, or if the user, on the other hand, decides to clear the secondary menu 90 from the screen, to return to the primary menu 80, the user simply slides the middle finger 88 outside of the area defined by the menu 90 and releases the middle finger 88, at that point indicating to the system that the secondary menu 90 is to be cleared. However, the primary menu 80 continues to be displayed on the screen 20 for as long as the index finger 84 remains in contact with the menu or the touch screen.

Figure 8:
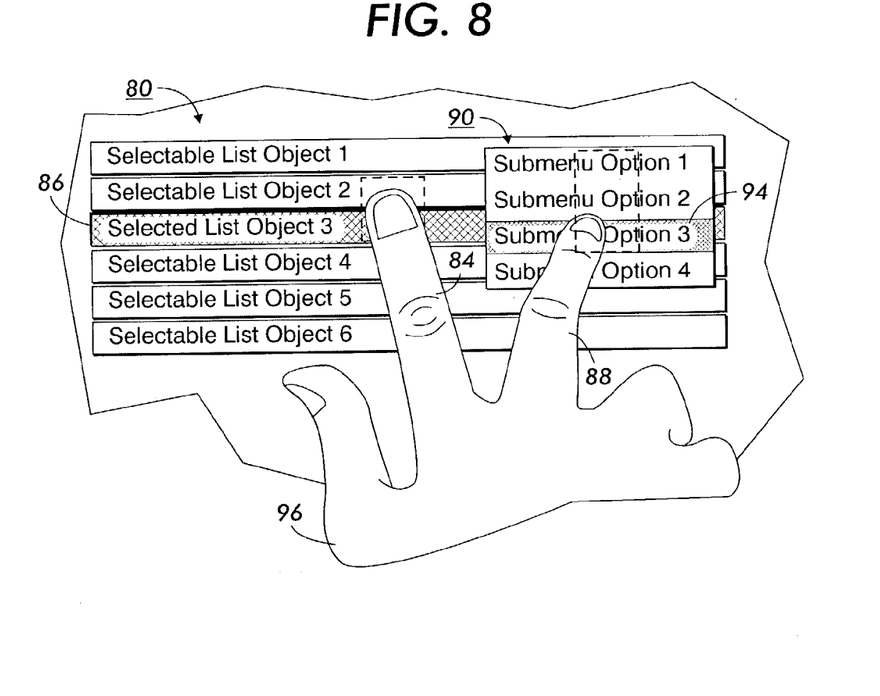
FIG. 8 is a view of the exemplary menus of FIG. 7 after selection of an alternate secondary list object.

While FIG. 7 illustrates the selection of secondary menu option 2, FIG. 8 shows a user maintaining the primary menu 80 and the secondary menu 90, while maintaining contact with both the index finger 84 and the middle finger 88, and sliding the middle finger 88, acting as a secondary pointer, into secondary menu option 3 represented by numeral 94. It should be noted, however, that while FIG. 8 illustrates a user utilizing a right hand 96 for performing the functions of selecting the primary menu 80 in the secondary menu 90, concepts of the present invention are not so limited.

Figure 9:
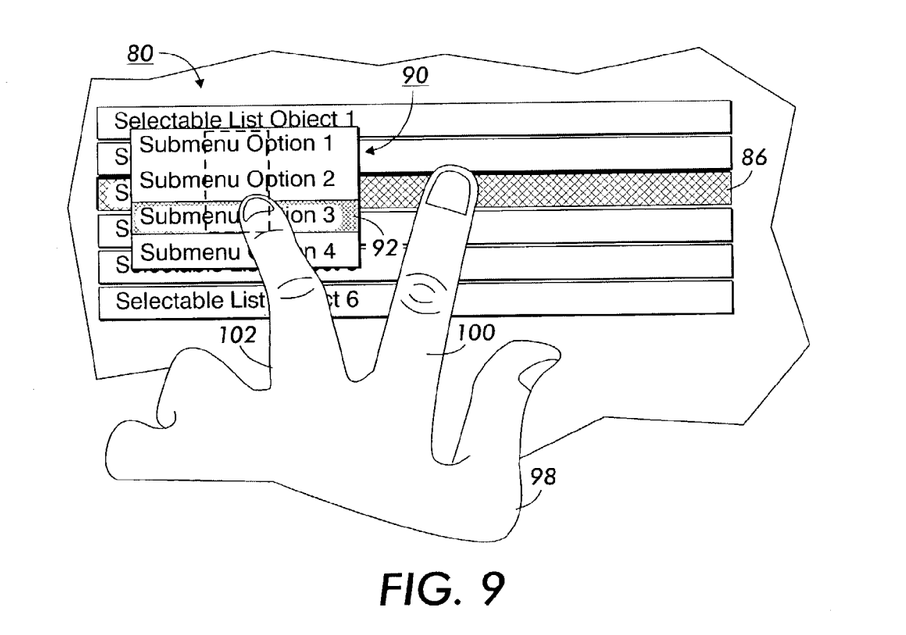
FIG. 9 is a view of an alternate arrangement similar in function to FIG. 8.
Figure 10:
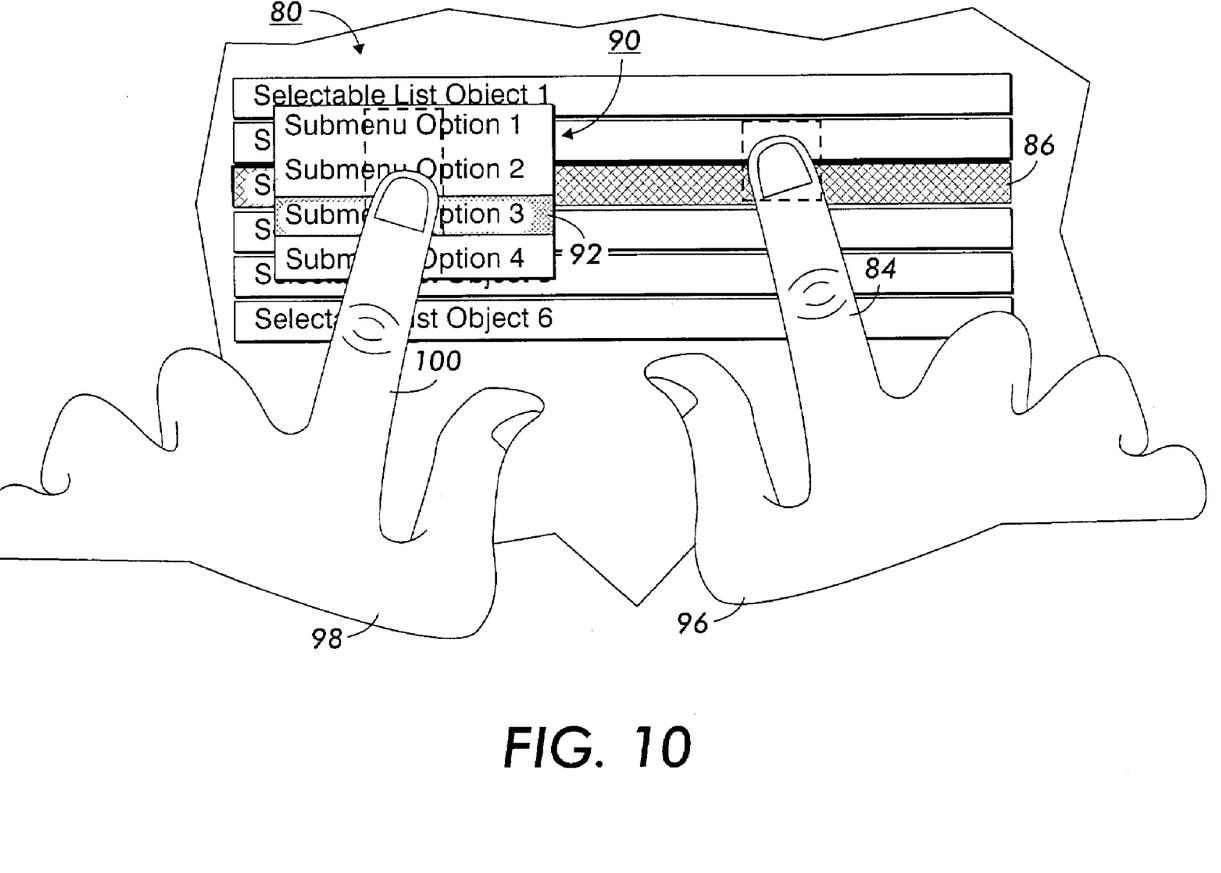
FIG. 10 is a view of another alternate arrangement similar in function to FIG. 8.

In FIG. 9, a user performs a function identical to that shown in FIG. 8, but using a left hand 98. A left index finger 100 is used as a primary pointer and a left middle finger 102 is used as a secondary pointer for selecting secondary menu option 3 represented by numeral 92. FIG. 10 illustrates another scenario where the user performs the selection with respect to the primary menu 80 and the secondary menu 90, but using the right hand 96 with the index finger 84 as a primary pointer, and the left hand 98 with the index finger 100 utilized as a secondary pointer for selecting secondary menu option number 3. In fact, the present invention does not limit the user to using one or two hands. Any two objects suitable as pointers for the touch screen 20 may be used for primary and secondary selections.

Figure 11:
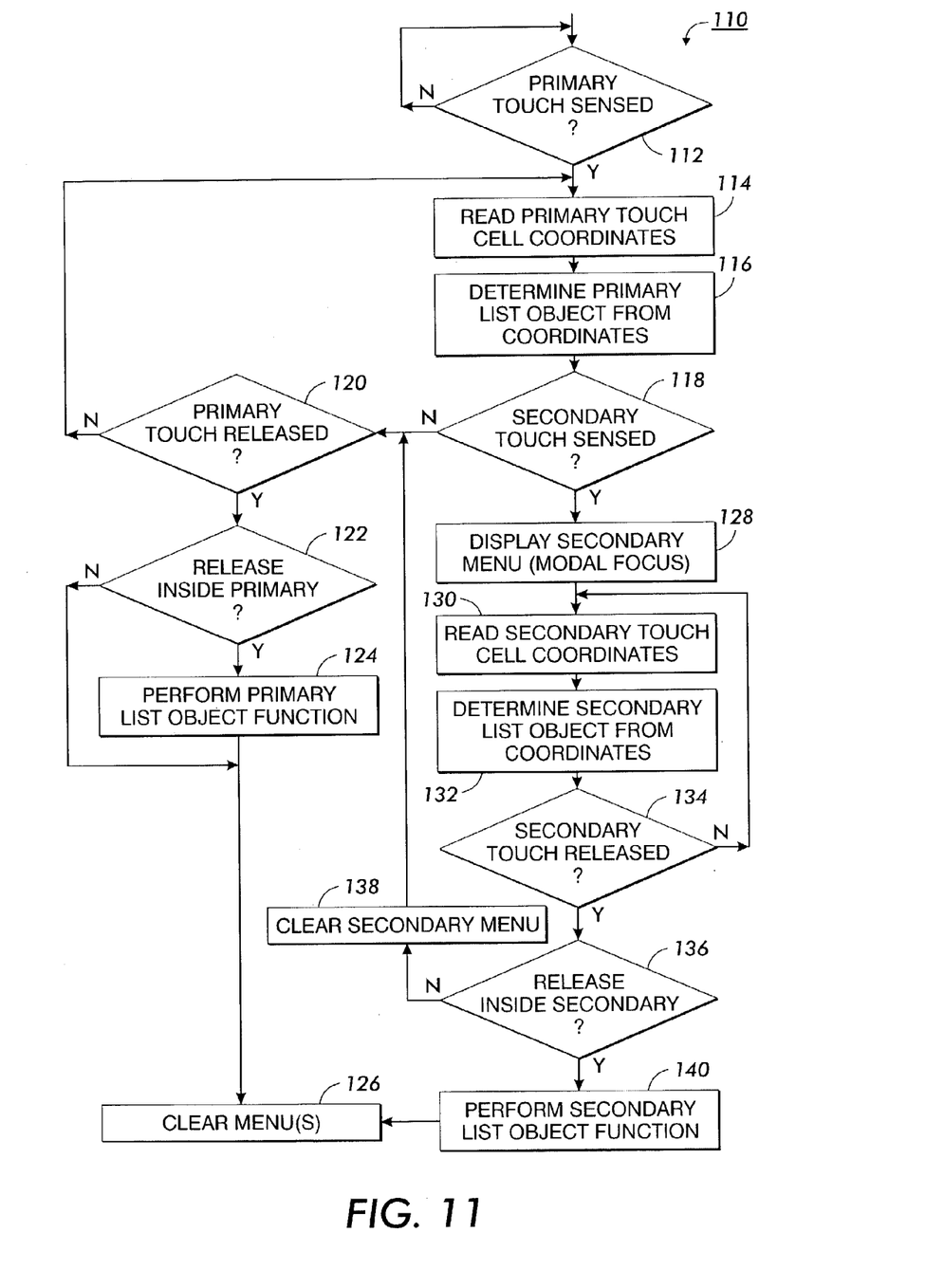
FIG. 11 is a flow chart illustrating a preferred secondary touch method of the present invention.

Referring now to FIG. 11, a flow chart is provided illustrating the control steps performed by the system controller in accordance with the present invention. At step 112, inquiry is made by the system controller to determine if a primary touch has been sensed. If not, this step is repeated. This condition is illustrated in FIG. 4. When a touch is sensed, as illustrated in FIG. 5, step 114 is invoked to determine primary touch cell coordinates. Once the primary touch cell coordinates have been determined, step 116 is invoked in order to determine the predefined object corresponding to the selected cell coordinates. The selected object is typically highlighted as shown by the selected list object 3, represented by numeral 86 in FIG. 5. The system controller then continues at step 118 to determine if a secondary touch has been sensed. If no secondary touch has been sensed, the system controller then inquires at step 120 whether the original primary touch has been released. If the primary touch has been determined to not have been released, essentially a status quo remains, although the user may have moved the primary touch pointer. Therefore the system returns to step 114 to reread the primary touch cell coordinates to determine, at step 116, if an alternate primary list object has been selected.

If, at step 120, the system controller determines that the primary touch has been released before a secondary touch has been sensed, or while no secondary touch is being sensed, the system controller inquires at step 122 whether the primary touch was released inside the boundary defined by the primary menu 80. If the primary pointer was released inside the boundary defined by the primary menu 80, then the function associated with the selected primary list object is performed at step 124. In either case, whether the primary list object was performed or whether no function was performed, the final step 126 is invoked which clears any menus from the screen and returns to normal operation.

Returning now to step 118, if a secondary touch is sensed by the system controller, the system, at step 128 displays a secondary menu with a modal focus in an area corresponding to the secondary touch location as determined by a reading of the of the secondary touch coordinates in step 128. The secondary menu displayed at step 128 may, however, be displayed so that the secondary menu 90 covers the full screen of the display 20, permitting more features, with finer granularity, within secondary menu 90. In steps 130 and 132, secondary touch cell coordinates are redetermined and a secondary list object is determined based on predefined cell coordinates corresponding to options listed in the secondary menu 90.

In step 134, if the secondary touch has not yet been released, the controller returns to step 130 to determine if the secondary pointer has moved to a new location. Once it is determined at step 134 that the secondary touch has been released, the controller determines, at step 136, whether the secondary touch was released within the boundary defined by the secondary menu 90 and, if not, at step 138, clears the secondary menu from the display screen 20 and continues processing at step 120 to determine if the primary touch has been released. If, however, at step 136, it is determined that the secondary touch was released within the secondary menu 90, then a function associated with the selected secondary list object is performed at step 140. At step 126, the primary and secondary menus are cleared from the screen and the system continues in normal operation.

While the above-described methods, as shown in FIG. 11, provide a means of presenting and selecting a primary menu, and objects from a secondary menu, it is to be appreciated that concepts of the present invention are not limited to only one secondary level, even when utilizing only two touch sensors. For example, referring to FIG. 10, if a user maintains contact with the left index finger 100, and releases contact with the primary pointer index finger 84, it is then possible for the left index finger 100 to assume the role of a primary index pointer wherein the secondary menu 90 assumes the role of a primary menu. The user may then retouch the screen at a desired location with the right index finger 84 and the system may then interpret that touch as a secondary touch and present a secondary menu which is subordinate to the new primary menu 90. This process can be repeated to an indefinite depth of secondary menus. With this in mind, a method is flow charted in FIG. 12 that illustrates how the process may continue to an indefinite depth.

Figure 12:
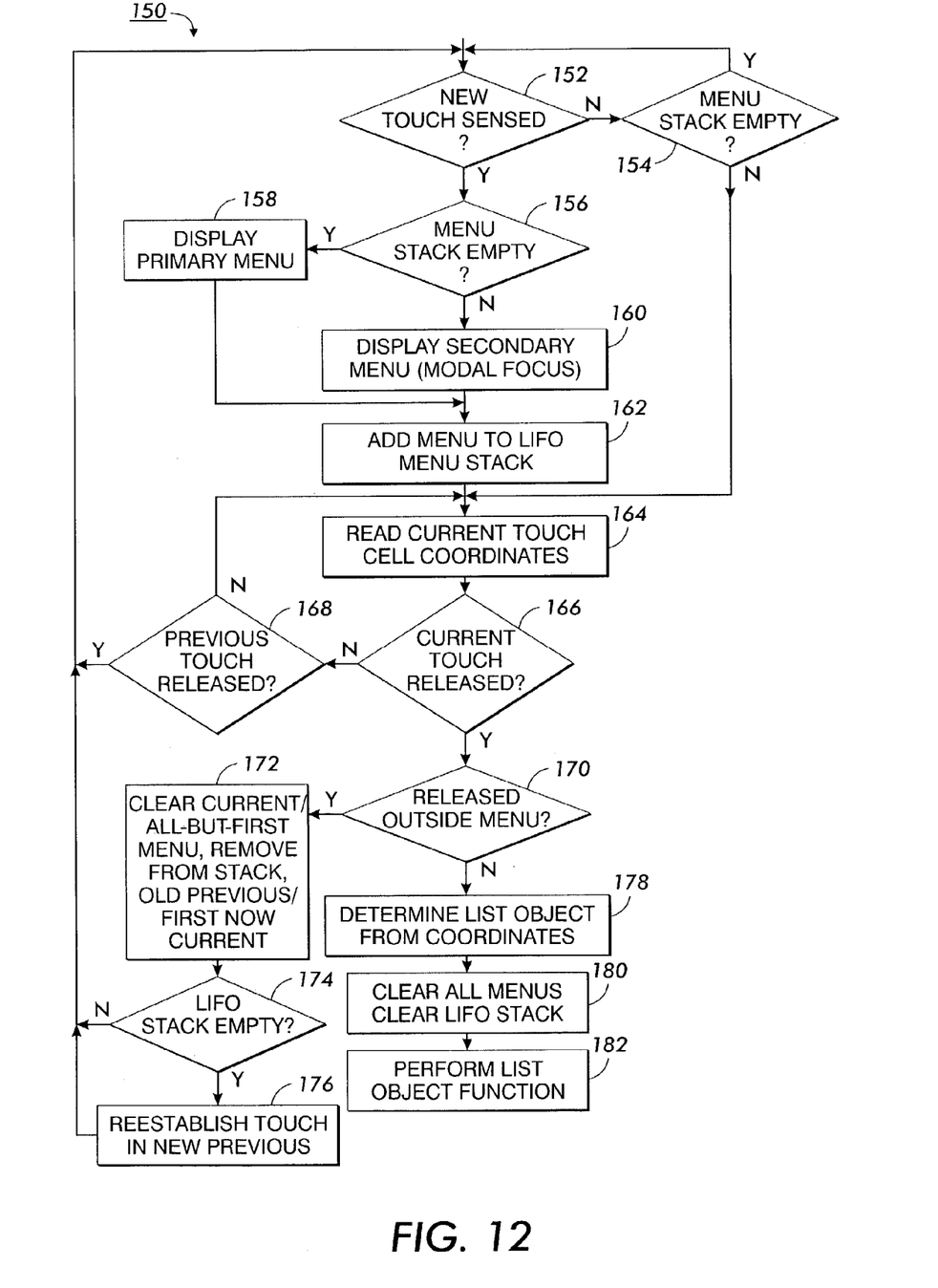
FIG. 12 is a flow chart illustrating an alternate secondary touch method of the present invention.

With respect to the method illustrated in FIG. 12, a last-in, first-out LIFO stack is maintained for the menus represented on display screen 20. In step 152 the system controller determines whether a new touch has been sensed. If no new touch has been sensed, the system inquires, at step 154, whether the afore-mentioned LIFO menu stack is empty. If the LIFO stack is empty, meaning that no menu selections are currently selected on the display screen 20, processing returns to step 152. If the system determines at step 152 that a new touch has been sensed, another inquiry is made at step 156 to determine if the LIFO menu stack is empty in order to determine whether or not to display a top level primary menu, at step 158, or whether to display a secondary type menu with modal focus at step 160. In either case, whether a top level primary menu is displayed or a secondary menu is displayed, processing continues at step 162 where the displayed menu is added to the LIFO menu stack. Processing also continues at step 164 if it were determined at step 154 that the LIFO menu stack was not empty and a new touch had not been sensed at step 152. At step 164, the system determines, for the touch corresponding to the last input menu in the LIFO menu stack, the cell coordinates of that touch, hereinafter referred to as the current touch. The touch corresponding to the menu entry immediately following the last input entry in the LIFO menu stack will hereinafter be referred to as the previous touch.

At step 166, it is determined by the system controller whether the current touch has been released. If the current touch has been released, the system controller queries at step 168 whether the previous touch has been released. If neither the current touch nor the previous has been released, processing returns to step 164 to read the current touch cell coordinates again in order to determine if the user has moved the primary touch pointer. If, at step 166, it was determined that the current touch has not been released, but at step 168 the previous touch has been released, the situation is such that the current touch representing a secondary menu can now assume the role of a primary touch, and the previous touch menu can now be cleared from the screen or simply ignored. The system returns then to step 152 to sense whether another touch has been sensed, which would consequently assume a secondary menu status.

If the system determines at step 166 that the current touch corresponding to the secondary menu has been released, step 170 determines whether the release was outside the defined menu area. If this is the case, the operator has indicated that he or she wishes to clear the current secondary menu without taking any action on any of the selectable list objects. At this point, in step 172, the system can be configured to respond in one of two ways. The system can be configured such that only the current secondary menu is cleared, leaving all remaining higher level menus in the LIFO stack, enabling the operator to step back up through menus in reverse order. However, it may also be desirable to configure the system such that if an operator decides to release a secondary menu, that all secondary menus are cleared and the system returns to the primary menu, in which case, at step 172, the system is configured to clear the LIFO stack of all but the first menu entry in the stack, the first menu entry being the primary menu entry. After one menu or all but one menu is/are cleared from the LIFO stack in step 172, either the previous menu or the original primary menu, now assumes of the role of current menu. If the current menu cleared at step 172 is the first menu in the LIFO stack, the condition exists where the operator has determined that he or she wishes to take no action on the primary menu, and the LIFO stack will be empty in such a case. At step 174, inquiry is made regarding the status of the LIFO stack, and if it is empty, processing returns to step 152 to detect new touches. If the LIFO stack is not empty, step 176 allows the user to reestablish a touch on either the previous menu which was the previous secondary menu, or on the primary menu, before returning processing to step 152 to test for new touches.

If step 170 determined that the user released his or her touch inside the current secondary menu, then step 178 determines the selected list object from the coordinates of the touch. Step 180 clears all menus from the screen and clears the LIFO stack of all the entries. In step 182, the function, or processing associated with the determined list object, is performed. The above-described method permits a user to go to an indefinite depth of levels of secondary menus and, depending on system configuration, the user may, from any depth of secondary menu, return either to the primary menu or to the previous secondary menu enabling him or her to step back through the menus in reverse order from the original selection.

While particular embodiments have been described, alternatives, modifications, variations, improvements, and substantial equivalents that are, or may be presently unforeseen, may arise to applicants or others skilled in the art. Accordingly, the appended claims as filed, and as they may be amended, are intended to embrace all such alternatives, modifications, variations, improvements and substantial equivalents.

What is claimed is:

1. A touch sensitive user interface system including:
   a display screen (20) for displaying a plurality of primary and secondary images (86,92) representative of primary and secondary selectable options;
   touch sensitive means (56) for detecting the concurrent presence of at least one of a first probe (84) and a second probe (88) in contact with the display screen (20); and,
   control logic (38), responsive to the touch sensitive means (56), for
      determining the first probe contact position,
      defining for each primary image representative of a primary selectable option, a first probe contact area of predetermined size, over which contact with the first probe selects the primary option,
      displaying a secondary menu (90) including a plurality of secondary images representative of secondary selectable options, and
      defining for each secondary image representative of a secondary selectable option, a second contact area of predetermined size, over which contact with the second probe selects the secondary option.

2. The system as set forth in claim 1, wherein the control logic is configured to determine a contact position of the second probe and display the secondary menu with focus in a contact area overlapping the second probe contact position.

3. The system as set forth in claim 1, wherein the secondary menu is contextually related to the selected primary option.

4. The system as set forth in claim 1, wherein the control logic is configured to complete the selected secondary option upon detection of contact release of the second probe.

5. The system as set forth in claim 1, wherein the control logic is configured to deselect the secondary options upon detection of movement while maintaining contact of the contact position of the second probe to one of an area outside the secondary menu and a non-selection area inside the secondary menu.

6. The system as set forth in claim 5, wherein the control logic is configured to remove the secondary menu upon detection of contact release of the second probe when the secondary options are deselected.

7. The system as set forth in claim 1, wherein the control logic is configured to upgrade the secondary menu to be the primary menu upon detection of contact release of the first probe, wherein the second probe subsequently functions as the first probe and vice versa.

8. A touch sensitive user interface system, operated in a xerographic environment, including:
   a display screen for displaying a plurality of primary and secondary images representative of primary and secondary selectable options;
   said display screen having associated closely therewith a plurality of light source and light detector pairs arranged with respect to the display screen and defining an array of detection cells thereover, said light sources and light detector pairs arranged to detect concurrent impingement of at least one of a first probe and a second probe at one or more of said detection cells defined thereby, and produce at least one of a first detection signal and a second detection signal indicative of impingement and the location thereof respectively; and,
   control logic for
      providing correspondence between one or more detection cells and the primary selectable options,
      defining for each primary image representative of a primary selectable option a primary group of cells at which contact with the first probe selects the primary option,
      displaying a secondary menu including a plurality of secondary images representative of secondary selectable options, and
      defining for each secondary image representative of a secondary selectable option, a secondary group of cells, over which contact with the second probe selects the secondary option.

9. The system as set forth in claim 8, wherein the control logic is configured to determine a concurrent contact position of the second probe and display the secondary menu with focus in a contact area overlapping the second probe contact position.

10. The system as set forth in claim 8, wherein the secondary menu is contextually related to the selected primary option.

11. The system as set forth in claim 8, wherein the control logic is configured to complete the selected secondary option upon detection of contact release of the second probe.

12. The system as set forth in claim 8, wherein the control logic is configured to deselect the secondary options upon detection of movement of the contact position while maintaining contact of the second probe to a group of cells not defined with respect to a secondary image.

13. The system as set forth in claim 12, wherein the control logic is configured to remove the secondary menu upon detection of contact release of the second probe while the secondary options are deselected.

14. The system as set forth in claim 8, wherein the control logic is configured to upgrade the secondary menu to be the primary menu upon detection of contact release of the first probe, wherein the second probe subsequently functions as the first probe and vice versa.

15. A method for secondary touch navigation comprising:
   displaying a plurality of primary and secondary images representative of primary and secondary selectable options on a display screen;
   detecting the presence of at least one of a first probe and a second probe in contact with the display screen;
   determining the first probe contact position,
   defining for each primary image representative of a primary selectable option, a first probe contact area of predetermined size, over which contact with the first probe selects the primary option,
   selecting a primary option by contact with the first probe;
   displaying a secondary menu including a plurality of secondary images representative of secondary selectable options upon simultaneous contact of the second probe, and
   defining for each secondary image representative of a secondary selectable option, a second contact area of predetermined size, over which contact with the second probe selects the secondary option.

16. The method as set forth in claim 15, further including:
   determining a contact position of the second probe; and, displaying the secondary menu with focus in a contact area overlapping the second probe contact position.

17. The method as set forth in claim 15, wherein the secondary menu is contextually related to the selected primary option.

18. The method as set forth in claim 15, further including: completing the selected secondary option upon detection of contact release of the second probe.

19. The method as set forth in claim 15, further including: deselecting the secondary options upon detection of movement of the contact position of the second probe to a non-selection area; and, removing the secondary menu upon detection of contact release of the second probe while the secondary options are deselected.

20. The method as set forth in claim 15, further including:

upgrading the secondary menu to be the primary menu upon detection of contact release of the first probe, wherein the second probe subsequently functions as the first probe and vice versa.

* * * * *